(12) United States Patent
Inada (10) Patent No.: US 8,428,263 B2
(45) Date of Patent: Apr. 23, 2013

(54) WIRELESS LAN DEVICE, WIRELESS LAN SYSTEM, AND COMMUNICATION METHOD FOR RELAYING PACKET

(75) Inventor: Tetsuya Inada, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 113 days.

(21) Appl. No.: 13/032,649

(22) Filed: Feb. 23, 2011

(65) Prior Publication Data

US 2011/0208968 A1 Aug. 25, 2011

(30) Foreign Application Priority Data

Feb. 24, 2010 (JP) .................................. 2010-038749

(51) Int. Cl.
*H04L 29/06* (2006.01)

(52) U.S. Cl.
USPC ........... 380/270; 380/255; 713/150; 713/168; 713/171

(58) Field of Classification Search .................. 380/270, 380/255; 713/150, 168, 171
See application file for complete search history.

(56) References Cited

U.S. PATENT DOCUMENTS

| | | | | |
|---|---|---|---|---|
| 7,024,553 | B1 * | 4/2006 | Morimoto ...................... | 713/163 |
| 2002/0061748 | A1 * | 5/2002 | Nakakita et al. .............. | 455/435 |
| 2002/0196764 | A1 * | 12/2002 | Shimizu ........................ | 370/338 |
| 2003/0131082 | A1 * | 7/2003 | Kachi ............................ | 709/220 |
| 2003/0219129 | A1 * | 11/2003 | Whelan et al. ................ | 380/270 |
| 2004/0005058 | A1 * | 1/2004 | Jang et al. ..................... | 380/270 |
| 2004/0203591 | A1 * | 10/2004 | Lee ................................ | 455/410 |
| 2005/0014503 | A1 * | 1/2005 | Nakakita et al. ........... | 455/435.1 |
| 2005/0130647 | A1 * | 6/2005 | Matsuda et al. ........... | 455/426.2 |
| 2005/0135416 | A1 * | 6/2005 | Ketchum et al. .............. | 370/469 |
| 2005/0135811 | A1 * | 6/2005 | Lee et al. ....................... | 398/139 |
| 2005/0136892 | A1 * | 6/2005 | Oesterling et al. ............ | 455/411 |
| 2005/0138355 | A1 * | 6/2005 | Chen et al. .................... | 713/155 |
| 2005/0148326 | A1 * | 7/2005 | Nogawa et al. ............... | 455/420 |
| 2005/0172119 | A1 * | 8/2005 | Eckhardt et al. .............. | 713/160 |
| 2005/0195778 | A1 * | 9/2005 | Bergs et al. ................... | 370/338 |
| 2005/0216751 | A1 * | 9/2005 | Dellmo et al. ................ | 713/189 |
| 2005/0226423 | A1 * | 10/2005 | Li et al. ......................... | 380/278 |
| 2005/0272420 | A1 * | 12/2005 | Matsuda et al. ........... | 455/426.2 |
| 2005/0276241 | A1 * | 12/2005 | Kamerman et al. .......... | 370/328 |
| 2006/0002334 | A1 * | 1/2006 | Washburn, III ............... | 370/328 |

(Continued)

FOREIGN PATENT DOCUMENTS

| | | |
|---|---|---|
| JP | H11-355867 A | 12/1999 |
| JP | 2006-050372 A | 2/2006 |

(Continued)

*Primary Examiner* — Yin-Chen Shaw
*Assistant Examiner* — Bradley Holder
(74) *Attorney, Agent, or Firm* — Judge Patent Associates (57) ABSTRACT

A wireless LAN device which performs wireless communication in a wireless network comprises: a communication section for performing the wireless communication such that a packet can be relayed in the wireless network; and a setting section for obtaining first identification information from another wireless LAN device present in a communicable state within a radio wave arrival range of the wireless LAN device, which first identification information can identify the other wireless LAN device, and setting a role for executing an asymmetric protocol asymmetric between the wireless LAN device and the other wireless LAN device, the role being set based on the first identification information, and second identification information, stored in the wireless LAN device, that can identify the wireless LAN device. The wireless LAN device shares an encryption key, based on the set role, and relays a packet by encrypting the packet by using the encryption key.

7 Claims, 4 Drawing Sheets

U.S. PATENT DOCUMENTS

| | | | |
|---|---|---|---|
| 2006/0039305 A1* | 2/2006 | Thawani et al. | 370/310 |
| 2006/0039337 A1* | 2/2006 | Hodoshima | 370/338 |
| 2006/0039340 A1* | 2/2006 | Ptasinski et al. | 370/338 |
| 2006/0039341 A1* | 2/2006 | Ptasinski et al. | 370/338 |
| 2006/0039360 A1* | 2/2006 | Thawani et al. | 370/352 |
| 2008/0085004 A1* | 4/2008 | Kitaj et al. | 380/281 |
| 2008/0186917 A1* | 8/2008 | Wu et al. | 370/331 |
| 2010/0268943 A1* | 10/2010 | Roy-Chowdhury et al. | 713/156 |
| 2011/0055407 A1* | 3/2011 | Lydon et al. | 709/228 |

FOREIGN PATENT DOCUMENTS

| | | |
|---|---|---|
| JP | 2006-148448 A | 6/2006 |
| JP | 2008-270999 A | 11/2008 |
| JP | 2009-267936 A | 11/2009 |
| JP | 2010-016510 A | 1/2010 |
| WO | WO-2005-034434 A1 | 4/2005 |

\* cited by examiner

WIRELESS LAN DEVICE, WIRELESS LAN SYSTEM, AND COMMUNICATION METHOD FOR RELAYING PACKET

CROSS REFERENCE TO RELATED APPLICATION

The disclosure of Japanese Patent Application No. 2010-038749, filed on Feb. 24, 2010, is incorporated herein by reference.

BACKGROUND OF THE INVENTION

1. Field of the Invention

The present invention relates to a wireless LAN device that performs wireless communication in a wireless network.

2. Description of the Background Art

In recent years, wireless LANs (Local Area Network) have been prevailing. Because the wireless LAN allows communication only within a radio wave arrival area of a wireless LAN client, the following technique has been developed. If communication over a broad area exceeding a radio wave arrival range of a wireless LAN client is performed, a plurality of wireless LAN devices each having functions of access point and station are provided and a packet is relayed among the plurality of wireless LAN devices. Such a technique is known as a WDS (Wireless Distribution System) (for example, see Japanese Laid-Open Patent Publication No. 2008-270999).

In communication between a wireless LAN device and a wireless LAN client, whether each of them is to function as an access point or a station is automatically determined. However, in the WDS, in communication between wireless LAN devices, whether each of them is to function as an access point or a station is not automatically determined. Therefore, if an asymmetric protocol which indicates different processing contents between an access point and a station is to be performed, an access point-station relationship between wireless LAN devices needs to be set in advance for convenience sake. Examples of such an asymmetric protocol are protocols used in processing of automatically setting wireless connection information for a network device which is performed by using an AOSS (AirStation One-Touch Secure System, trademark of BUFFALO INC.), a WPS (Wi-Fi Protected Setup), or the like, or protocols used in encryption key exchange processing using WPA (Wi-Fi Protected Access), WPA2, or the like which is performed for encryption communication using a dynamic encryption key. However, work for setting an access point-station relationship as described above can be troublesome to a user, and can be difficult for a novice user.

SUMMARY OF THE INVENTION

An object of the present invention is to realize a wireless LAN device that can solve one or more of the above problems, and that can easily execute an asymmetric protocol that is asymmetric between wireless LAN devices that operate as repeaters or relaying devices.

The present invention is applied to a wireless LAN device which performs wireless communication in a wireless network. The wireless LAN device comprises: a communication section for performing the wireless communication such that a packet can be relayed in the wireless network; a setting section for obtaining first identification information from another wireless LAN device that is present, in a communicable state, within a radio wave arrival range of the wireless LAN device, which first identification information can identify the other wireless LAN device, and setting a role for executing an asymmetric protocol that is asymmetric between the wireless LAN device and the other wireless LAN device, the role being set by a predetermined method, based on the first identification information, and second identification information that is stored in the wireless LAN device and can identify the wireless LAN device; and an execution section for executing the asymmetric protocol, based on the role that has been set.

The wireless LAN device sets a role for executing an asymmetric protocol that is asymmetric between the wireless LAN device and the other wireless LAN device, based on the first identification information obtained from the other wireless LAN device, and second identification information stored in the wireless LAN device, and executes the asymmetric protocol, based on the role. Thus, each of such wireless LAN devices can automatically execute an asymmetric protocol that is asymmetric between the wireless LAN devices, without a user performing a specific setting operation.

According to an aspect of the present invention, the wireless LAN device may include a sharing section for generating a predetermined encryption key, and sharing the predetermined encryption key with the other wireless LAN device, and the communication section may, in relaying the packet, encrypt the packet by using the shared encryption key.

The wireless LAN device relays the packet by encrypting the packet by using an encryption key shared with the other wireless LAN device. Thus, security can be assured. In addition, since the shared encryption key is generated based on the set role, the wireless LAN device does not need to set an encryption key in advance, thereby improving the convenience for the user. Alternatively, since the wireless LAN device can generate an encryption key different from an encryption key that is set in advance, it is difficult for a malicious third person to specify the encryption key, thereby improving security.

According to another aspect of the present invention, the sharing section may share the predetermined encryption key with the other wireless LAN device while changing the predetermined encryption key at a predetermined timing. The wireless LAN device having such a configuration can share a dynamic encryption key with the other wireless LAN device. Therefore, security can be significantly improved.

According to another aspect of the present invention, the sharing section may exchange information needed for generating the predetermined encryption key with the other wireless LAN device, by the wireless communication, and the exchange of the information may be performed by encrypting the exchange by a predetermined encryption method.

The wireless LAN device exchanges information needed for generating the encryption key with the other wireless LAN device, by encrypting the exchange by a predetermined encryption method. Thus, information needed for generating the encryption key can be prevented from being leaked, and security can be improved.

According to another aspect of the present invention, the first identification information may include a BSSID set for the other wireless LAN device, the second identification information may include a BSSID set for the wireless LAN device, and the setting section may set the role, based on a magnitude relationship between the value of the BSSID set for the wireless LAN device and the value of the BSSID set for the other wireless LAN device.

The wireless LAN device sets the roles, based on a magnitude relationship between the value of the BSSID set for the wireless LAN device and the value of the BSSID set for the other wireless LAN device. Normally, a BSSID is included in a management frame. Therefore, the wireless LAN device can easily obtain a BSSID, and can set a role by using a simple configuration. In addition, normally, a BSSID coincides with a MAC address which is uniquely defined for each wireless LAN device. Therefore, a plurality of wireless LAN devices do not use an identical BSSID, whereby it is ensured that roles can be set.

According to another aspect of the present invention, the present invention is applied to a wireless LAN system including two or more wireless LAN devices which perform wireless communication in a wireless network. The above object is attained by each of the two or more wireless LAN devices comprising: a communication section for performing the wireless communication such that a packet can be relayed between the two or more wireless LAN devices; a setting section for obtaining identification information from another wireless LAN device that is present, in a communicable state, within a radio wave arrival range of the wireless LAN device, which identification information can identify the other wireless LAN device, and setting a role for executing an asymmetric protocol that is asymmetric between the wireless LAN device and the other wireless LAN device, the role being set based on the identification information that has been obtained from the other wireless LAN device, and identification information that is stored in the wireless LAN device and can identify the wireless LAN device; and an execution section for executing the asymmetric protocol, based on the role that has been set.

According to another aspect of the present invention, the present invention is applied to a computer-readable non-transitory storage medium having stored therein a program for allowing a wireless LAN device, which performs wireless communication in a wireless network, to relay a packet in the wireless network. The above object is attained by the program, when the program is executed by a computer of the wireless LAN device, causing the computer to execute: a communication function of performing the wireless communication such that a packet can be relayed in the wireless network; a setting function of obtaining first identification information from another wireless LAN device that is present, in a communicable state, within a radio wave arrival range of the wireless LAN device, which first identification information can identify the other wireless LAN device, and setting a role for executing an asymmetric protocol that is asymmetric between the wireless LAN device and the other wireless LAN device, the role being set based on the first identification information, and second identification information that is stored in the wireless LAN device and can identify the wireless LAN device; and an execution function of executing the asymmetric protocol, based on the role that has been set.

According to another aspect of the present invention, the present invention is applied to a method for allowing a wireless LAN device, which performs wireless communication in a wireless network, to relay a packet in the wireless network. The above object is attained by performing the wireless communication such that a packet can be relayed in the wireless network; obtaining first identification information from another wireless LAN device that is present, in a communicable state, within a radio wave arrival range of the wireless LAN device, which first identification information can identify the other wireless LAN device, and setting a role for executing an asymmetric protocol that is asymmetric between the wireless LAN device and the other wireless LAN device, the role being set based on the first identification information, and second identification information that is stored in the wireless LAN device and can identify the wireless LAN device; and executing the asymmetric protocol, based on the role that has been set.

DESCRIPTION OF THE PREFERRED EMBODIMENTS

Figure 1:
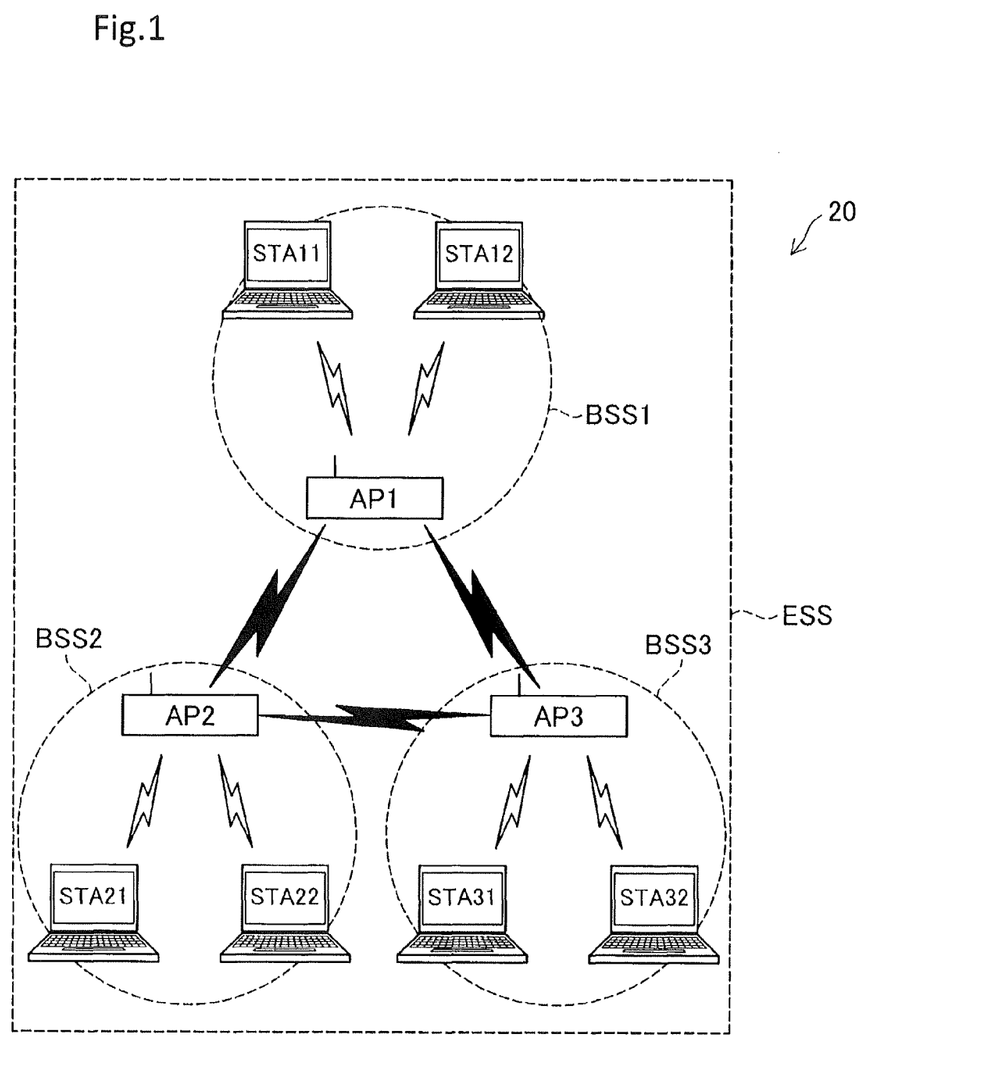
FIG. 1 is a diagram showing a schematic configuration of a wireless LAN system of an embodiment of the present invention.

FIG. 1 is a diagram showing a schematic configuration of a wireless LAN system 20 of an embodiment of the present invention. As shown in FIG. 1, the wireless LAN system 20 includes three wireless LAN devices WLD1 to WLD3 each having functions of access point and station (client that is not an access point), and six wireless clients STA11 to STA32. In the present embodiment, the wireless LAN devices WLD1 to WLD3 and the wireless clients STA11 to STA32 are based on the IEEE (the Institute of Electrical and Electronics Engineers) 802.11 standard.

In the present embodiment, the wireless LAN devices WLD1 to WLD3 have the same configurations, and have WDS functions of relaying packets among wireless LAN devices. The wireless LAN devices WLD1 to WLD3 are provided within the radio wave arrival range of each other, and can communicate with each other. It is noted that the number of wireless LAN devices that is needed is more than two.

In the present embodiment, the wireless clients STA11 to STA32 are general-purpose computers including, for example, wireless LAN cards or wireless LAN modules. The wireless clients STA11 and STA12 can communicate with each other via the wireless LAN device WLD1 in an infrastructure mode, and the wireless clients STA11 and STA12 and the wireless LAN device WLD1 form a wireless network BSS1. The wireless clients STA21 and STA22 and the wireless LAN device WLD2 form a wireless network BSS2, and the wireless client STA31 and STA32 and the wireless LAN device WLD3 form a wireless network BSS3. In addition, the wireless networks BSS1 to BSS3 form an ESS (Extended Service Set), and the wireless clients STA11 to STA32 can communicate with each other via the wireless LAN devices WLD1 to WLD3. It is noted that the number of wireless clients is not limited. For example, only one wireless client may be present for one wireless LAN device, or there may be a wireless LAN device for which no wireless client that can communicate with the wireless LAN device is present.

Figure 2:
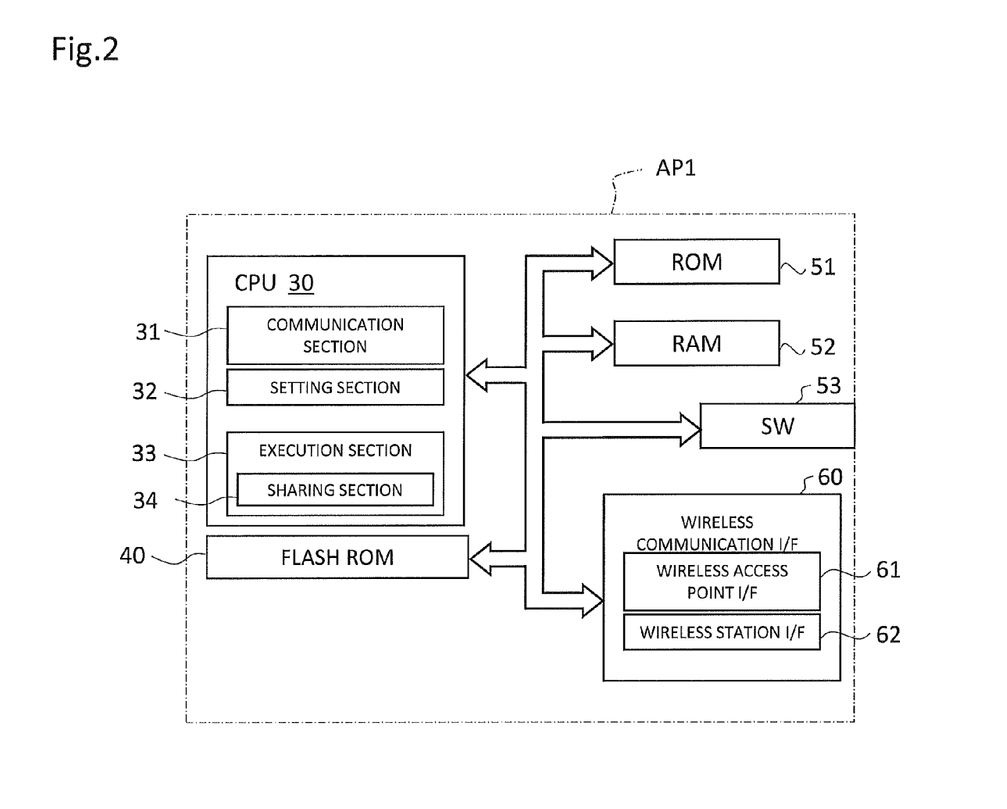
FIG. 2 is a block diagram showing a schematic configuration of a wireless LAN device WLD1 of the embodiment of the present invention.

FIG. 2 shows a schematic diagram of the wireless LAN device WLD1, as representative one of the wireless LAN devices WLD1 to WLD3 having the same configurations. As shown in FIG. 2, the wireless LAN device WLD1 includes a CPU (Central Processing Unit) 30, a flash ROM (Read Only Memory) 40, a ROM 51, a RAM (Random Access Memory) 52, a switch 53, and a wireless communication interface 60, and these components are connected to each other via a bus.

The CPU 30 decompresses, in the RAM 52, a program such as firmware stored in the flash ROM 40 or the ROM 51, and executes the program, thereby controlling overall operation of the wireless LAN device WLD1. In addition, the CPU 30 realizes an AOSS function by using a predetermined program, and also functions as a communication section 31, a setting section 32, an execution section 33, and a sharing section 34. The details of these function sections will be described later. The flash ROM 40 stores firmware for performing various initial settings for the wireless LAN device WLD1 and performing operations of the wireless LAN device WLD1 including automatic connection processing, access point function processing, and WDS function processing which will be described later The firmware is read by the CPU 30 when the CPU 30 is powered on. Upon operation of the wireless LAN device WLD1, a program such as firmware is decompressed in the RAM 52 as mentioned above, and the RAM 52 temporarily stores various parameters and the like that are needed for the operation of the wireless LAN device WLD1.

The switch 53 is an AOSS button for automatically setting various types of wireless connection information such as an ESSID (Extended Service Set Identifier) and an encryption key. The AOSS performs processing of, based on an access from a station, transmitting wireless connection information generated by an access point to the station, and performing setting such that the access point and the station can communicate with each other (for example, see Japanese Laid-Open Patent Publication No. 2005-142907 for seeing a general content of the AOSS). Because the AOSS is a known technique, the detailed description thereof is omitted. It is noted that the switch 53 only needs to be an interface for automatically setting wireless connection information. For example, if the CPU 30 can realize a WPS function, the switch 53 may be a WPS button.

The wireless communication interface 60 is an interface for performing wireless communication based on at least the IEEE 802.11 standard, and includes a wireless access point interface 61, and a wireless station interface 62. The wireless access point interface 61 functions as a wireless access point (hereinafter, which may be simply referred to as an access point), and receives a packet from a wireless station (hereinafter, which may be simply referred to as a station). The wireless station interface 62 functions as a station, and transmits a packet to an access point. That is, the wireless LAN device WLD1 functions as both an access point and a station. The wireless access point interface 61 and the wireless station interface 62 are provided in the wireless LAN device WLD1 such that they can transmit a radio wave to outside or receive a radio wave from outside. It is noted that the wireless access point interface 61 and the wireless station interface 62 may be formed by one wireless module, or may be respectively formed by different modules.

Next, the automatic connection processing by the wireless LAN system 20 will be described. In the present embodiment, according to the automatic connection processing, each of the wireless LAN devices WLD1 to WLD3 automatically performs connection setting by using the AOSS, and operates as one of an Ethernet converter (station), an access point, and a repeater (access point and WDS) in accordance with the usage environment. In the present embodiment, this processing is started by a user pressing the switch 53. Hereinafter, operation of the wireless LAN device WLD1 will mainly be described, for the purpose of simplifying the description.

Figure 3:
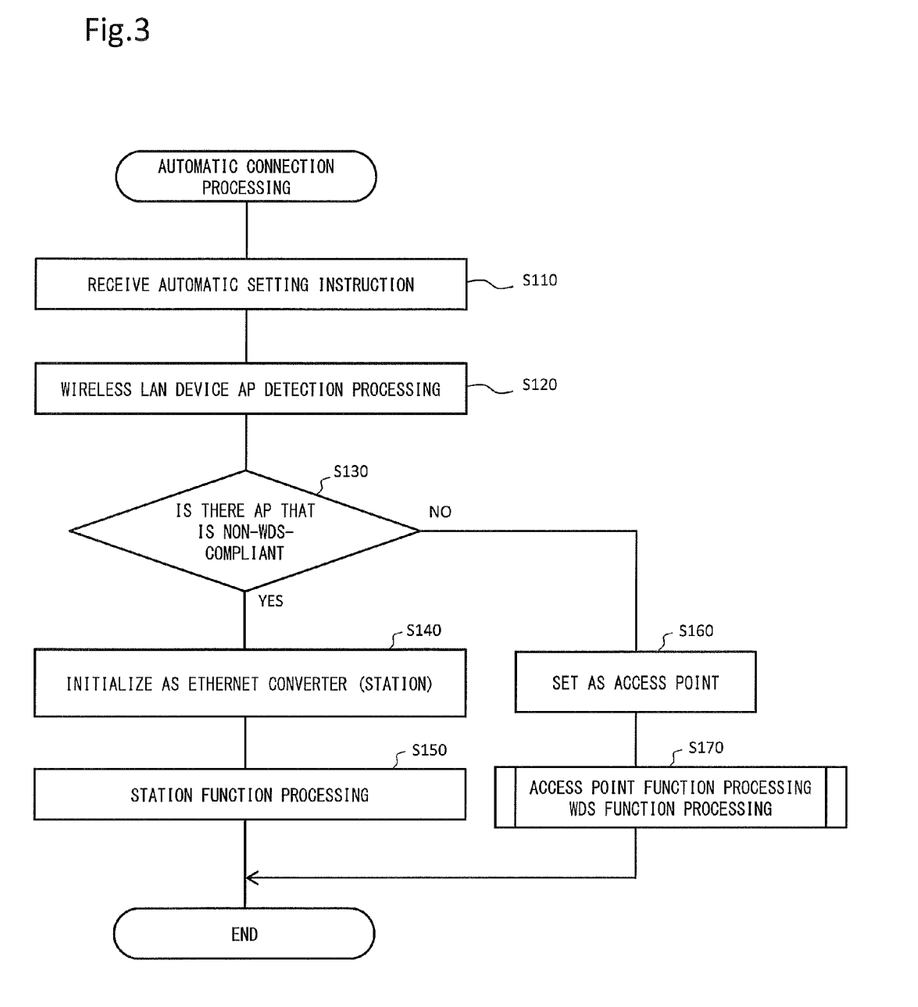
FIG. 3 is a flowchart showing a flow of automatic connection processing.

As shown in FIG. 3, the automatic connection processing is started by the CPU 30 of the wireless LAN device WLD1 receiving an automatic connection setting instruction corresponding to the operation of pressing the switch 53 of the wireless LAN device WLD1 (step S110). When the CPU 30 has received the automatic connection setting instruction, the CPU 30 executes wireless LAN device detection processing (step S120). This processing is performed by the CPU 30 of the wireless LAN device WLD1 broadcasting a probe request, and receiving a probe response transmitted by another wireless LAN device (in this case, the wireless LAN device WLD2 or WLD3).

When the CPU 30 has executed the wireless LAN device detection processing, the CPU 30 determines whether or not a wireless LAN device that is non-WDS-compliant has been discovered (step S130). The frame configuration of a probe response is prescribed by the IEEE 802.11 standard, and the frame elements of the probe response frame include an optional field that can freely be defined by a vender. In the present embodiment, the CPU 30 of each of the wireless LAN devices WLD2 and WLD3 transmits a probe response including model number information about the wireless LAN device in the optional field. When the CPU 30 of the wireless LAN device WLD1 has received the probe response, the CPU 30 interprets the information in the optional field of the probe response, and checks the information with a WDS correspondence list which is stored in advance, thereby performing the determination in step S130.

As a result, if the CPU 30 of the wireless LAN device WLD1 has determined that a wireless LAN device that is non-WDS-compliant is present (YES in step S130), the CPU 30 initializes the wireless LAN device WLD1 as an Ethernet converter (station) (step S140), and starts station function processing (step S150), because a wireless LAN device that is non-WDS-compliant (in this case, the wireless LAN device WLD2 or WLD3) can operate only as an access point. The station function processing is processing of, based on the AOSS, receiving wireless connection information from an access point, setting the wireless connection information, and performing communication, as a station.

On the other hand, if the CPU 30 of the wireless LAN device WLD1 has determined that a wireless LAN device that is non-WDS-compliant is not present (NO in step S130), the CPU 30 sets the wireless LAN device WLD1 as an access point (step S160), and starts access point function processing and WDS function processing (step S170). In the present embodiment, the access point function processing is processing of, based on the AOSS, setting wireless connection information, and performing operation as an access point. In addition, the WDS function processing is processing of, based on the AOSS, setting wireless connection information, and performing operation as a repeater (access point and WDS). The access point function processing and the WDS function processing are concurrently executed. It is noted that in the present embodiment, communication performed in the access point function processing and the WDS function processing is encrypted by a WPA2-PSK-AES.

Figure 4:
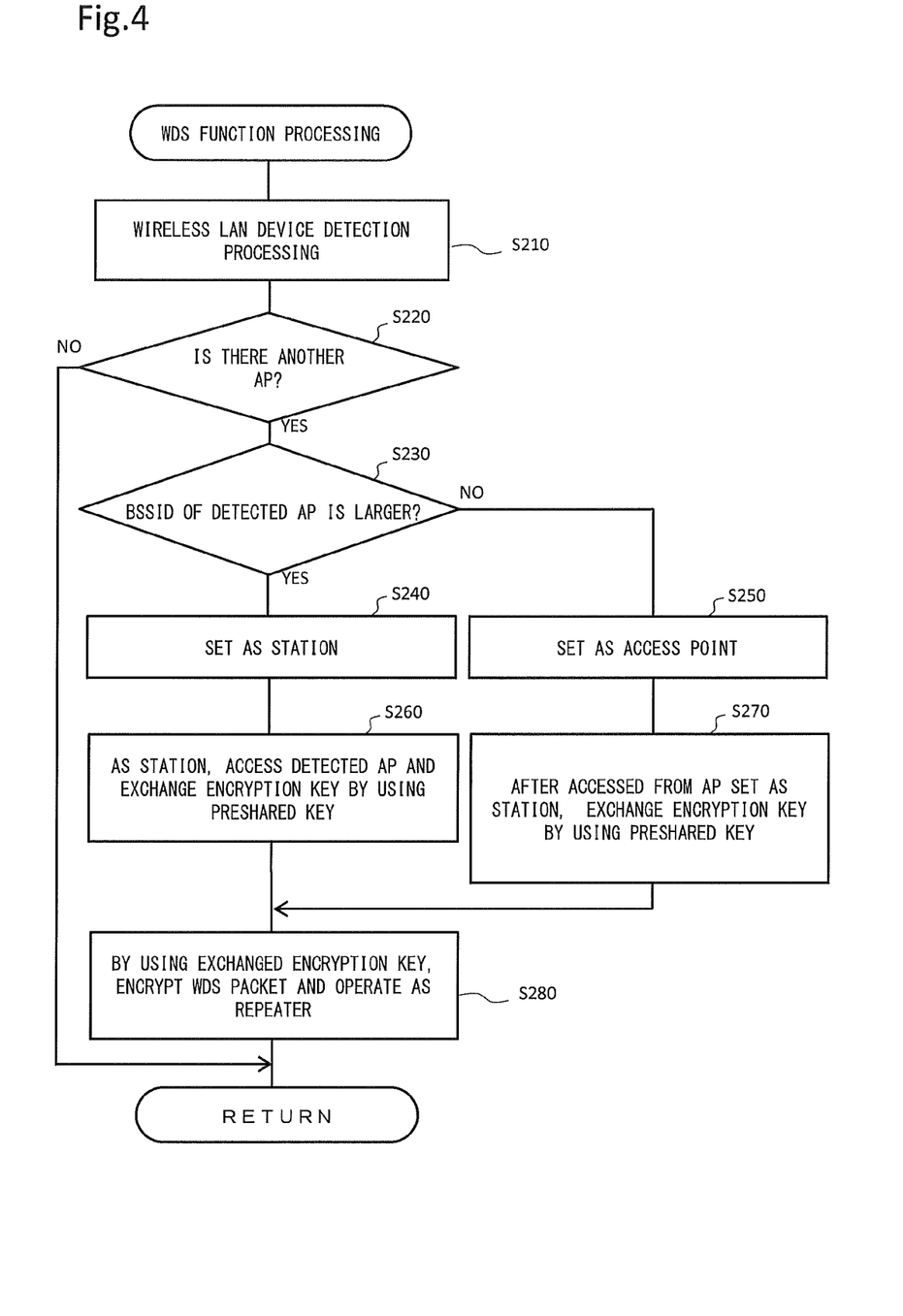
FIG. 4 is a flowchart showing a flow of WDS function processing in the automatic connection processing.

The details of the WDS function processing (step S170) will be described with reference to FIG. 4. It is noted that because the access point function processing is a known technique, the description thereof is omitted. When the WDS function processing has been started, first, the CPU 30 of the wireless LAN device WLD1 performs wireless LAN device detection processing (step S210) as shown in FIG. 4. In the present embodiment, this processing is performed by the CPU 30 of the wireless LAN device WLD1 broadcasting a probe request, and receiving a probe response transmitted by another wireless LAN device WLD2 or WLD3, and by the CPU 30 of the wireless LAN device WLD1 receiving a beacon transmitted by the other wireless LAN device WLD2 or WLD3.

The above processing of receiving two types of packets to detect another wireless LAN device WLD2 or WLD3 is for ensuring that the BSSID (Basic Service Set Identifier) of the other wireless LAN device WLD2 or WLD3, which is used in step S230 described later, is obtained. Such a configuration enables a BSSID to be easily obtained even if a beacon does not include a BSSID, or even if a probe request cannot be transmitted because a channel to be used is in a busy state. However, the present invention does not exclude a configuration in which a BSSID is obtained by using one of a beacon and a probe request. It is noted that, normally, BSSIDs can be obtained from the headers of beacon frames and the headers of probe response frames.

When the wireless LAN device detection processing has been executed, the CPU 30 of the wireless LAN device WLD1 determines whether or not the other wireless LAN device WLD2 or WLD3 is present (step S220). This determination is performed based on whether or not the BSSID of the other wireless LAN device WLD2 or WLD3 has been obtained in step S210. As a result, if the CPU 30 of the wireless LAN device WLD1 has determined that the other wireless LAN device WLD2 or WLD3 is not present (NO in step S220), the CPU 30 ends the WDS function processing.

On the other hand, if the CPU 30 of the wireless LAN device WLD1 has determined that the other wireless LAN device WLD2 or WLD3 is present (YES in step S220), the CPU 30 of the wireless LAN device WLD1 determines whether or not the value of the BSSID of the other wireless LAN device WLD2 or WLD3 detected in step S210 is larger than the value of the BSSID of the wireless LAN device WLD1 (step S230). In the present embodiment, the determination about the values of the BSSIDs is performed by converting the BSSIDs into binary values and comparing them with each other. This determination in step S230 is performed for virtually setting an access point-station relationship among the wireless LAN devices WLD1 to WLD3 having WDS functions. The reason why a virtual access point-station relationship is set as described above is as follows. That is, processing of exchanging an encryption key among the wireless LAN devices WLD1 to WLD3 (the details of this processing will be described later) uses an asymmetric protocol which indicates different processing contents between an access point and a station of wireless LAN devices. Therefore, an access point-station relationship needs to be set for convenience sake, in order to execute such an asymmetric protocol. Setting of such an access point-station relationship can be understood as setting of roles for executing an asymmetric protocol.

As a result, if the CPU 30 of the wireless LAN device WLD1 has determined that the value of the BSSID of the other wireless LAN device WLD2 or WLD3 is larger than the value of the BSSID of the wireless LAN device WLD1 (YES in step S230), the CPU 30 causes the setting section 32 of the wireless LAN device WLD1 to virtually set the wireless LAN device WLD1 as a station (step S240). On the other hand, if the CPU 30 has determined that the value of the BSSID of the other wireless LAN device WLD2 or WLD3 is equal to or smaller than the value of the BSSID of the wireless LAN device WLD1 (NO in step S230), the CPU 30 causes the setting section 32 to virtually set the wireless LAN device WLD1 as an access point (step S250). It is noted that processing in steps S230 to S250 only needs to set a virtual access point-station relationship, based on the magnitude relationship between the values of BSSIDs. The correspondence relationship between: the magnitude relationship between the values of BSSIDs; and an access point-station relationship to be set, may be the inverse of the above pattern. For example, if the BSSID of the other wireless LAN device WLD2 or WLD3 is larger than that of the wireless LAN device WLD1, the wireless LAN device WLD1 may be virtually set as an access point. In addition, the alignment orders of the numerical numbers or the alphabets included in BSSIDs may be compared. Alternatively, BSSIDs may be converted into binary values, the binary values may be subjected to a predetermined operation, and the resultant values may be compared.

Then, if the CPU 30 of the wireless LAN device WLD1 has set the wireless LAN device WLD1 as a station (step S240), the CPU 30 causes the sharing section 34 of the execution section 33 to, as a station, transmit an association request to the other wireless LAN device WLD2 or WLD3, and exchange an encryption key with the other wireless LAN device WLD2 or WLD3 (step S260). This processing is executed as key exchange processing using the AOSS. Specifically, an access point (in this case, the wireless LAN device WLD2 or WLD3 operating in its access point role) that has received an association request from a station (in this case, the wireless LAN device WLD1 operating in its station role) transmits an association response, and then the access point generates random numbers (ANonce) and transmits the ANonce to the station. The station that has received the ANonce generates random numbers (SNonce), generates a transient key PTK (Pairwise Transient Key) based on a master key PMK (Pairwise Master Key), the ANonce, and the Snonce, and then transmits the Snonce to the access point. The station that has received the Snonce generates the transient key PTK based on the master key PMK, the ANonce, and the Snonce, in the same manner as the station. In this way, the access point and the station can exchange (share) the transient key PTK.

In the present embodiment, the communication for sharing a transient key PTK as described above is encrypted by a predetermined encryption method using a preshared key PSK. In the present embodiment, the predetermined encryption method is an AES (Advanced Encryption Standard). However, the predetermined encryption method may be another method such as a WEP (Wired Equivalent Privacy) or a TKIP (Temporal Key Integrity Protocol). Such encrypted communication can enhance security. It is noted that in the present embodiment, preshared keys PSK which are set in the respective wireless LAN devices WLD1 to WLD3 by default in the manufacturing phase are used as master keys PMK. However, one of the wireless LAN devices WLD1 to WLD3 that has been set as an access point may generate a preshared key PSK, and transmit the preshared key PSK to another one of the wireless LAN devices WLD1 to WLD3 that has been set as a station, with the radio wave arrival range being limited in comparison with a normal state, as one of AOSS functions. Consequently, the preshared key PSK can be shared while the preshared key PSK can be prevented from being intercepted by other wireless clients.

On the other hand, if the CPU 30 of the wireless LAN device WLD1 has set the wireless LAN device WLD1 as an access point (step S250), the CPU 30 causes the sharing section 34 of the execution section 33 to receive an association request from the wireless LAN device WLD2 or WLD3 that has been set as a station, and exchange a transient key PTK (step S270). This processing is similar to the processing performed in step S260 by the wireless LAN device WLD2 or WLD3 that has been set as an access point.

When the transient key PTK has been shared as described above, in step S280, the CPU 30 of the wireless LAN device WLD1 encrypts a WDS function processing packet by using the transient key PTK, and causes the communication section 31 of the wireless LAN device WLD1 to perform operation (WDS operation) as a repeater with the other wireless LAN device WLD2 or WLD3 that has been detected in step S210. It is noted that the frame configuration of an association request is prescribed by the IEEE 802.11 standard, and the frame elements of the association request include an optional field as described above. In the present embodiment, in step S260, the CPU 30 transmits an association request including, in the optional field, information about whether or not a WDS operation is performed. By the above configuration, one of the wireless LAN devices WLD1 to WLD3 that has been set as an access point and has received an association request can recognize that another one of the wireless LAN devices WLD1 to WLD3 that has been set as a station performs a WDS operation, and thereby can automatically start a WDS operation.

When WDS function processing has been performed as described above, the CPU 30 can change the transient key PTK to be shared with the other wireless LAN device WLD2 or WLD3 which performs a WDS operation, at a predetermined timing. A method for sharing the changed transient key PTK may be the same as in step S260. The predetermined timing of changing a transient key PTK may be set as appropriate. A transient key PTK may be changed at predetermined intervals, for example, every predetermined communication time, every session, or every predetermined communication amount. The predetermined intervals may be switched among these patterns in a random manner. Sharing such a dynamic transient key PTK can significantly enhance security.

In the wireless LAN system 20 having the above-described configuration, each of the wireless LAN devices WLD1 to WLD3 sets a virtual access point-station relationship for sharing (exchanging) an encryption key, based on the BSSID of the wireless LAN device (for example, the wireless LAN device WLD1), and the BSSID of another one of the wireless LAN devices WLD1 to WLD3 (for example, the wireless LAN device WLD2 or WLD3). Thus, each of the wireless LAN devices WLD1 to WLD3 can automatically execute an asymmetric protocol for sharing an encryption key. As a result, the user does not need to take the trouble to set a virtual access point-station relationship, whereby convenience is improved.

In addition, each of the wireless LAN devices WLD1 to WLD3 relays a packet while encrypting the packet by using the shared encryption key. Thus, security can be assured. In addition, based on a set virtual access point-station relationship, the wireless LAN devices WLD1 to WLD3 can share a dynamic transient key PTK. Therefore, encrypted communication can be performed by using WPA, WPA2, or the like which has a high security level, whereby security is significantly improved. It is noted that if a virtual access point-station relationship cannot be set, the wireless LAN devices WLD1 to WLD3 cannot share a dynamic transient key PTK, and can only perform encrypted communication having a relatively low security level, by WEP or the like using a static encryption key.

In addition, each of the wireless LAN devices WLD1 to WLD3 sets a virtual access point-station relationship, based on a magnitude relationship between the values of their respective BSSIDs. Usually, a BSSID is included in a management frame. Therefore, each of the wireless LAN devices WLD1 to WLD3 can easily obtain a BSSID, and can set a virtual access point-station relationship by using a simple configuration. In addition, usually, a BSSID coincides with a MAC address which is uniquely defined for each of the wireless LAN devices WLD1 to WLD3. Therefore, a plurality of wireless LAN devices WLD1 to WLD3 do not use an identical BSSID, whereby it is ensured that a virtual access point-station relationship can be set.

In the present embodiment, a configuration that, by setting a virtual access point-station relationship, allows exchange of an encryption key which is an asymmetric protocol, is described. However, an asymmetric protocol is not limited to exchange of an encryption key. For example, the present invention can also be applied to a protocol for sharing authentication information by the AOSS. In addition, the present invention is not limited to wireless LAN devices performing WDS operations, and can be widely applied to wireless LAN devices not having an access point-station relationship. For example, the present invention can be applied to wireless LAN devices forming a mesh network, thereby uniquely determining the one that gives a dynamic encryption key and the one that the dynamic encryption key is given to.

In addition, in the present embodiment, wireless LAN communication can be performed among the wireless LAN devices WLD1 to WLD3 and the wireless clients STA11 to STA32. However, for example, at least one of the wireless LAN devices WLD1 to WLD3 may be allowed to communicate with another wireless LAN device, based on the IEEE 802.11 standard, and the other wireless LAN device may be allowed to communicate with a LAN (Local Access Network) or a WAN (Wide Area Network). This configuration enables the wireless clients STA11 to STA32 to communicate with the LAN or the WAN via the wireless LAN devices WLD1 to WLD3 and the other wireless LAN device. Needless to say, at least one of the wireless LAN devices WLD1 to WLD3 may have a function of so-called switching hub, and the wireless clients STA11 to STA32 may communicate with the LAN or the WAN via the at least one of the wireless LAN devices WLD1 to WLD3 having the function of switching hub.

In addition, in the present embodiment, roles (an access point-station relationship indicating an access point and a station for convenience sake) for executing an asymmetric protocol are set based on BSSIDs in steps S230 to S250. However, information for setting the roles only needs to be information allowing the wireless LAN devices WLD1 to WLD3 to be identified. For example, the information may be individual identifiers such as MAC addresses, serial numbers of products, or UDIDs.

While the invention has been thus far described, elements other than those recited in independent claims, among elements described in the present embodiment of the present invention, are additional elements, and can be omitted or combined as appropriate. In addition, the present invention is not limited to the present embodiment. It will be understood that the present invention can be implemented in various embodiments without departing from the scope of the invention. For example, aspects of the present invention can be realized as a wireless LAN system and a wireless LAN device, as well as programs for configuring the devices' CPUs, recording media in which such programs are stored, and methods for setting roles for executing an asymmetric protocol that is asymmetric between the wireless LAN devices. The recording media may be non-transitory, such as computer-readable recording media, or transitory, such as propagation signals.

What is claimed is:

1. A claimed wireless local-area network (LAN) device for performing wireless communications in a wireless network, the claimed wireless LAN device comprising:
    a wireless communications interface composed of a wireless station interface and a wireless access point interface;
    memory storing claimed-device identification information including a basic service set identifier (BSSID) established for said claimed wireless LAN device and therein identifying said claimed wireless LAN device on the wireless network;

a central processing unit configured to function as a communications circuit having software for performing, via said wireless communications interface, wireless communications enabling relaying of wireless packets on the wireless network, a wireless LAN device detector for probe-request/probe-response based detecting, via said wireless communications interface, of whether a different wireless LAN device is within wireless reception range of said claimed wireless LAN device and if so, whether that different wireless LAN device is wireless distribution system (WDS)-compliant, a setting circuit having software for obtaining, if said wireless LAN device detector has detected that a different wireless LAN device is within wireless reception range of said claimed wireless LAN device and the different wireless LAN device is WDS-compliant, different-device identification information from the different wireless LAN device, the different-device identification information including a BSSID established for the different wireless LAN device and therein identifying the different wireless LAN device to said claimed wireless LAN device, comparing the different-device identification information with said claimed-device identification information, and based on a relationship in predetermined BSSID-corresponding magnitudes for said claimed wireless LAN device and for the different wireless LAN device, determining a virtual access-point-station relationship according to which said setting circuit virtually configures said claimed wireless LAN device either as a station or as an access point, the virtual access-point-station relationship conditioning an asymmetric protocol between said claimed wireless LAN device and the different wireless LAN device, wherein when according to the virtual access-point-station relationship said setting circuit virtually configures said claimed wireless LAN device as a station, said wireless station interface functions as a station, and when according to the virtual access-point-station relationship said setting circuit virtually configures said claimed wireless LAN device as an access point, said wireless access point interface functions as a wireless access point, and an execution circuit having software for executing the asymmetric protocol based on the virtual access-point-station relationship determined by said setting circuit, said execution circuit including a sharing circuit having software for generating a predetermined encryption key and sharing the predetermined encryption key with the different wireless LAN device; wherein said communications circuit, in relaying wireless packets, encrypts the packets using the shared encryption key.

2. The claimed wireless LAN device according to claim 1, wherein the sharing circuit shares the predetermined encryption key with the different wireless LAN device while changing the predetermined encryption key at a predetermined timing.

3. The claimed wireless LAN device according to claim 1, wherein:

via the wireless communications the sharing circuit exchanges with the different wireless LAN device information necessary to generate the predetermined encryption key; and the exchange of information between the sharing circuit and the different wireless LAN device is performed encrypted by a predetermined encryption method.

4. A system of at least two wireless LAN devices, each said wireless LAN device being a claimed wireless LAN device as set forth in claim 1.

5. The claimed wireless LAN device according to claim 1, wherein if said wireless LAN device detector detects that a different wireless LAN device is within wireless reception range and that the different wireless LAN device is not WDS-compliant, said setting circuit initializes said claimed wireless LAN device as a wireless station.

6. A computer-readable non-transitory recording medium on which is recorded a program that is for causing an executing wireless local-area network (LAN) device that performs wireless communications in a wireless network and that comprises a wireless communications interface composed of a wireless station interface and a wireless access point interface, and a computer, and that stores executing-device identification information including a basic service set identifier (BSSID) established for the executing wireless LAN device and therein identifying the executing wireless LAN device on the wireless network, to relay wireless packets on the wireless network, the program when executed by the computer in the executing wireless LAN device causing the computer to execute:

a communications application for performing wireless communications enabling relaying of wireless packets on the wireless network;

a wireless LAN device detecting application for probe-request/probe-response based detecting of whether a different wireless LAN device is within wireless reception range of the executing wireless LAN device and if so, whether that different wireless LAN device is wireless distribution system (WDS)-compliant;

a setting application for obtaining, if said wireless LAN device detecting application has detected that a different wireless LAN device is within wireless reception range of the executing wireless LAN device and the different wireless LAN device is WDS-compliant, different-device identification information from the different wireless LAN device, the different-device identification information including a BSSID established for the different wireless LAN device and therein identifying the different wireless LAN device to the executing wireless LAN device, comparing the different-device identification information with the executing-device identification information, and based on a relationship in predetermined BSSID-corresponding magnitudes for the executing wireless LAN device and for the different wireless LAN device, determining a virtual access-point-station relationship according to which said setting application virtually configures the executing wireless LAN device either as a station or as a access point, the virtual access-point-station relationship conditioning an asymmetric protocol between the executing wireless LAN device and the different wireless LAN device, wherein when according to the virtual access-point-station relationship said setting application virtually configures the executing wireless LAN device as a station, the executing wireless LAN device's wireless station interface functions as a station, and when according to the virtual access-point-station relationship said setting application virtually configures the executing wireless LAN device as an access point, the executing wireless LAN device's wireless access point interface functions as a wireless access point; and an execution application for executing the asymmetric protocol based on the virtual access-point-station relationship determined by said setting application, said execution application including a sharing application for generating a predetermined encryption key and sharing the predetermined encryption key with the different wireless LAN device; wherein said communications application, in relaying wireless packets, encrypts the packets using the shared encryption key.

7. A communications method for causing an executing wireless local-area network (LAN) device that performs wireless communications in a wireless network and comprises a wireless communications interface composed of a wireless station interface and a wireless access point interface, and that stores executing-device identification information including a basic service set identifier (BSSID) established for the executing wireless LAN device and therein identifying the executing wireless LAN device on the wireless network, to relay wireless packets on the wireless network, the communications method for relaying wireless packets comprising:

(a) performing wireless communications enabling relaying of wireless packets on the wireless network;

(b) probe-request/probe-response based detecting whether a different wireless LAN device is within wireless reception range of the executing wireless LAN device and if so, whether that different wireless LAN device is wireless distribution system (WDS)-compliant;

(c) obtaining, if said probe-request/probe-response based detecting has detected that a different wireless LAN device is within wireless reception range of the executing wireless LAN device and the different wireless LAN device is WDS-compliant, different-device identification information from the different wireless LAN device, the different-device identification information including a BSSID established for the different wireless LAN device and therein identifying the different wireless LAN device to the executing wireless LAN device, comparing the different-device identification information with the executing-device identification information, and based on a relationship in predetermined BSSID-corresponding magnitudes for the executing wireless LAN device and for the different wireless LAN device, determining a virtual access-point-station relationship, and according to the virtual access-point-station relationship virtually configuring the executing wireless LAN device either as a station or as an access point, the virtual access-point-station relationship conditioning an asymmetric protocol between the executing wireless LAN device and the different wireless LAN device, wherein when according to the virtual access-point-station relationship the executing wireless LAN device is virtually configured as a station, the executing wireless LAN device's wireless station interface functions as a station, and when according to the virtual access-point-station relationship the executing wireless LAN device is virtually configured as an access point, the executing wireless LAN device's wireless access point interface functions as a wireless access point; and (d) executing the asymmetric protocol based on the virtual access-point-station relationship determined in (c), generating a predetermined encryption key, and sharing the predetermined encryption key with the different wireless LAN device; wherein in (a) the wireless packets are encrypted using the encryption key generated and shared in (d).

* * * * *